(12) United States Patent
Narita et al.

(10) Patent No.: US 7,661,773 B2
(45) Date of Patent: Feb. 16, 2010

(54) METHOD OF BRAKING FORCE DISTRIBUTION AND BRAKING FORCE CONTROL SYSTEM FOR VEHICLE

(75) Inventors: Tetsuhiro Narita, Nagano (JP); Susumu Takahashi, Saitama (JP); Takeshi Kojima, Saitama (JP)

(73) Assignees: Nissin Kogyo Co., Ltd., Ueda-shi (JP); Honda Motor Co., Ltd., Tokyo (JP)

( * ) Notice: Subject to any disclaimer, the term of this patent is extended or adjusted under 35 U.S.C. 154(b) by 370 days.

(21) Appl. No.: 11/492,992

(22) Filed: Jul. 26, 2006

(65) Prior Publication Data

US 2007/0024114 A1 Feb. 1, 2007

(30) Foreign Application Priority Data

Jul. 29, 2005 (JP) ............................. 2005-220236

(51) Int. Cl.
*B60T 8/62* (2006.01)
(52) U.S. Cl. .................................... 303/186; 303/9.62
(58) Field of Classification Search ................ 303/9.62, 303/186, 187, 188, 9.69, 9.71
See application file for complete search history.

(56) References Cited

U.S. PATENT DOCUMENTS

| | | | | |
|---|---|---|---|---|
| 5,405,183 A | * | 4/1995 | Aizawa et al. | 303/156 |
| 5,547,264 A | * | 8/1996 | Tozu et al. | 303/9.62 |
| 5,842,755 A | * | 12/1998 | Sugimoto et al. | 303/186 |
| 5,855,419 A | * | 1/1999 | Urai et al. | 303/186 |
| 5,887,957 A | * | 3/1999 | Buttner et al. | 303/186 |
| 6,267,454 B1 | * | 7/2001 | Takahashi | 303/186 |
| 6,338,017 B1 | * | 1/2002 | Kato et al. | 303/186 |
| 6,595,600 B2 | * | 7/2003 | Banno et al. | 303/186 |

FOREIGN PATENT DOCUMENTS

| | | |
|---|---|---|
| DE | 196 24 491 C2 | 1/1997 |
| DE | 197 38 738 A1 | 3/1998 |
| JP | 06144176 A  * | 5/1994 |
| JP | 2003-118552 | 4/2003 |

* cited by examiner

*Primary Examiner*—Thomas J Williams
(74) *Attorney, Agent, or Firm*—Kratz, Quintos & Hanson, LLP

(57) ABSTRACT

A method of braking force distribution and a braking force control system for a vehicle provide a proper control on distribution between braking force between front wheels and rear wheels by controlling braking force on a rear right wheel and a rear left wheel such that an actual wheel speed of each rear wheel follows a target wheel speed thereof. The method includes the steps of calculating a current target wheel speed of each rear wheel to be used based on an actual deceleration speed of at least one of the front wheels and a previous target wheel speed of each rear wheel; and controlling braking force on each of the rear wheels based on the thus calculated current target wheel speed.

15 Claims, 6 Drawing Sheets

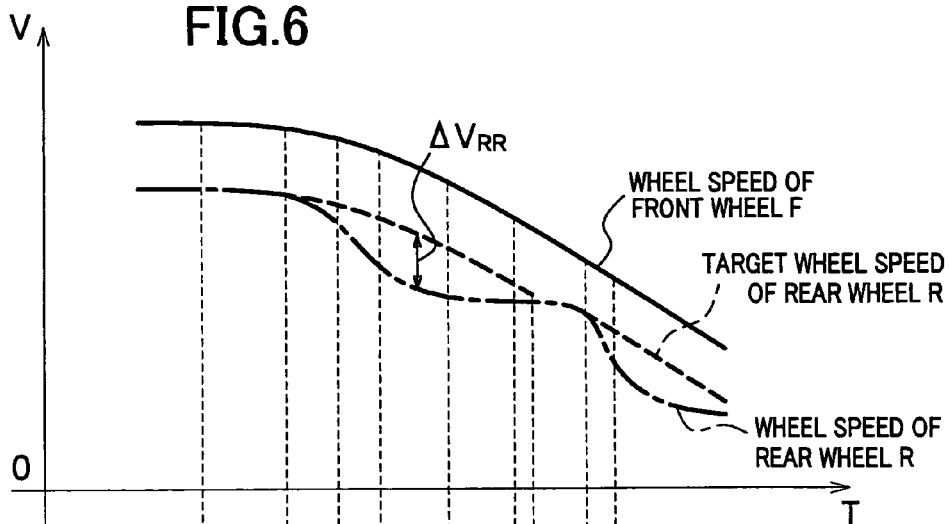
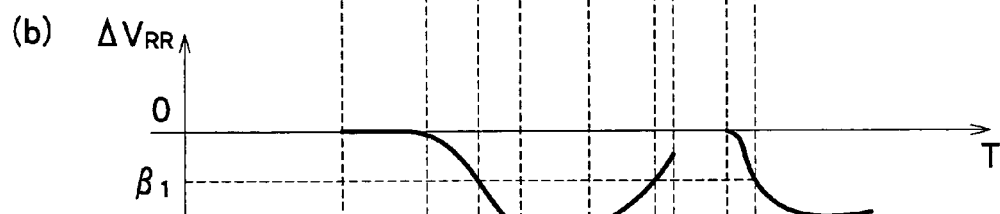
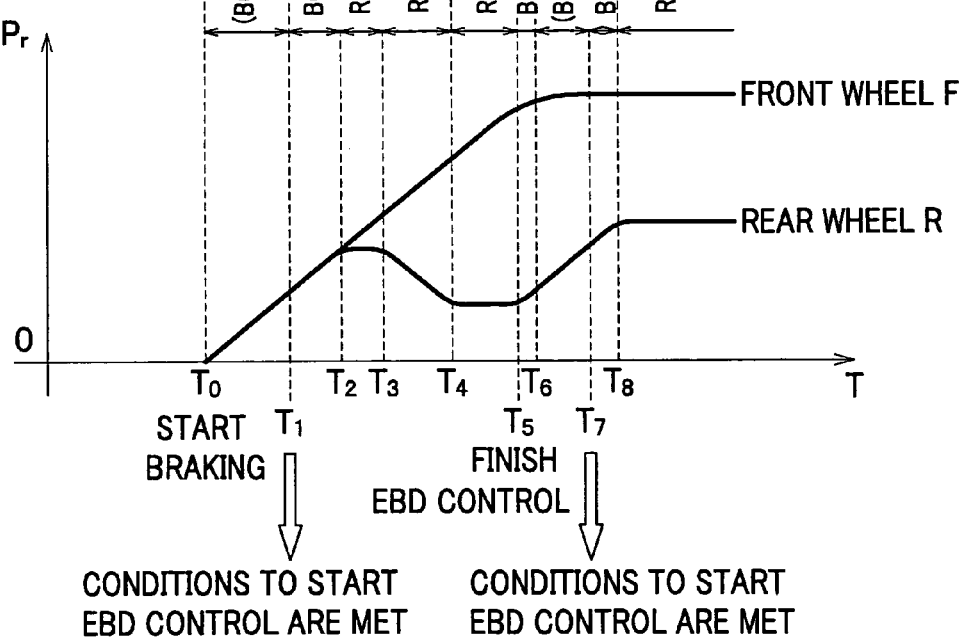
FIG.6

METHOD OF BRAKING FORCE DISTRIBUTION AND BRAKING FORCE CONTROL SYSTEM FOR VEHICLE

CROSS-REFERENCE TO RELATED APPLICATION

This application claims the benefit of Japanese Patent Application No. 2005-220236 filed on Jul. 29, 2005, the disclosure of which is incorporated herein by reference.

BACKGROUND OF THE INVENTION

1. Field of the Invention

This invention relates to a method of braking force distribution and a braking force control system for a vehicle.

2. Description of the Related Art

There has been a problem, if braking force is applied to both of a front wheel brake and a rear wheel brake of a four-wheel automotive vehicle or the like, that a center of gravity of the vehicle shifts forward and a vertical load of the rear wheels becomes smaller, so that the rear wheels are likely to be locked.

To counter this problem, there has been proposed a braking force distribution method for providing proper distribution between braking force on the front wheels and braking force on the rear wheels, depending on load shifting due to load condition change or deceleration, whereby the brakes can stably work.

Such a method of braking force distribution has been usually realized by providing proportioning valves in brake pipes. Recently, a braking force distribution method employs control logic on a braking force control system for a vehicle, which is capable of anti-lock brake control.

For example, JP2003-118552A discloses a method of braking force distribution in which, if a value yielded by subtracting a rear wheel speed from a front wheel speed is more than a first predetermined value, brake hydraulic pressure on the rear wheels is reduced so as to reduce a braking ratio of braking force on the rear wheels so that on the front wheels; if the subtracted value is smaller than a second predetermined value that is smaller than the first predetermined value, the brake hydraulic pressure on the rear wheels is boosted so as to increase the braking ratio of the braking force on the rear wheels to that on the front wheels. In the method of the braking force distribution disclosed in JP2003-118552A, a target wheel speed of the rear wheels is an actual wheel speed of the front wheels, and the braking force on the rear wheels is controlled such that the actual wheel speed of the rear wheels follows the actual wheel speed of the front wheels. Accordingly it is possible to control distribution between the braking force on the rear wheel side and the braking force on the front wheel side. The wheel speed can be obtained by multiplying rotation speed (angular velocity) of the wheel detected by a wheel speed sensor provided on the wheel to a radius of the wheel (tire radius).

By the way, not to mention when the rear wheels are equipped with tires having different radius from those of the front wheels, if there occurs a difference between a radius of the front wheel tires and that of the rear wheel tires due to, for example, a difference in abrasion rate or air pressure, an inevitable difference occurs on rotation speed between the rear wheel and the front wheel regardless of an existence of the wheel lock. Hence, it is required to grasp an actual radius of each tire. Otherwise, there occurs a difference in wheel speed that is obtained by multiplying a tire radius by the rotation speed.

Even if each front and rear tire has the same radius, the rear wheel have a different turning radius from that of the front wheel, therefore, there occurs an inevitable difference in rotation speed between the rear wheel and the front wheel, as well.

Specifically, a value yielded by subtracting the rear wheel speed from the front wheel speed includes an error due to difference in tire radius between the rear wheel and the front wheel. If the braking force on the rear wheel is boosted or reduced based on a value including such an error, electromagnetic valves provided in the brake hydraulic pressure circuit excessively work, resulting in producing unpleasant noises which may not only give passengers unpleasant feelings but also hinder driver's braking feelings.

In the light of the above problems, there has been requested a method of braking force distribution for properly controlling distribution between braking force on the front wheels and braking force on the rear wheels, in which, even if an inevitable difference in wheel speed exists between the rear wheels and the front wheels, it is possible to properly control distribution between the braking force on the rear wheel side and the braking force on the front wheel side. There has also been requested a braking force control system for a vehicle realizing such a method for braking force distribution.

SUMMARY OF THE INVENTION

One aspect of this invention provides a method of distributing braking force between front wheels and rear wheels by controlling braking force on a rear right wheel and a rear left wheel such that an actual wheel speed of each rear wheel follows a target wheel speed thereof. The method includes the steps of calculating a current target wheel speed of each rear wheel to be used based on an actual deceleration speed of at least one of the front wheels and a previous target wheel speed of each rear wheel; and controlling braking force on each of the rear wheels based on the thus calculated current target wheel speed.

In this method, the current target wheel speed of each rear wheel to be used is calculated by setting an actual deceleration speed of at least one of the front wheels as a target deceleration speed of each rear wheel; and calculating a value obtained by subtracting the target deceleration speed of each rear wheel from a corresponding previous target wheel speed of each rear wheel.

Further, in this method, the target deceleration speed of each rear wheel may be based on an actual deceleration speed of a front wheel on a same side of each rear wheel, based on an average value of actual deceleration speeds of the front wheels, or based on an either smaller value of actual deceleration speeds of the front wheels.

Another aspect of this invention provides a braking force control system for a vehicle includes a braking force distribution control unit for controlling braking force on a rear right wheel and a rear left wheel such that an actual wheel speed of each rear wheel follows a target wheel speed thereof; a target wheel deceleration setting unit for setting a target deceleration speed of each rear wheel based on an actual deceleration speed of at least one of the front wheels; and a target wheel speed calculating unit for calculating a current target wheel speed of each rear wheel to be used based on the target deceleration speed of each rear wheel set by the target wheel deceleration setting unit and a previous target wheel speed thereof.

In this braking force control system for a vehicle, the target wheel deceleration setting unit sets the actual deceleration speed of at least one of the front wheels as the target deceleration speed of each rear wheel, and the target wheel speed calculating unit calculates the current target wheel speed of each rear wheel to be used by subtracting the target deceleration speed of each rear wheel set by the target wheel deceleration setting unit from the previous target wheel speed thereof.

Further, in this braking force control system for a vehicle, the target deceleration speed of each rear wheel is based on an actual deceleration speed of a front wheel on a same side as that of each rear wheel, based on an average value of actual deceleration speeds of the front wheels, or based on an either smaller value of actual deceleration speeds of the front wheels.

Other features and advantages of this invention will become more apparent from the following detailed description of the invention when taken in conjunction with the accompanying exemplary drawings.

BRIEF DESCRIPTION OF THE DRAWINGS

FIG. 6(a) is a graph showing how change the rear speed and front wheel speed over time; FIG. 6(b) is a graph showing how changes the speed difference between the actual speed of the rear wheel and the target wheel speed over time; and FIG. 6(c) is a graph showing how changes the brake hydraulic pressure effecting on the wheel brake over time.

DETAILED DESCRIPTION OF PREFERRED EMBODIMENT

Detailed explanations will be provided on an embodiment of this invention, with reference to drawings.

A braking force control system for a vehicle U1 according to the embodiment of this invention controls increase/decrease of brake hydraulic pressure effecting on wheel brakes FR, FL that brake right/left front wheels F,F respectively and on wheel brakes RR, RL that brake right/left rear wheels R,R respectively, whereby performing anti-lock brake control (hereinafter referred to as "ABS control") for independently controlling the wheel brakes FR, RL, RR, FL, and braking force distribution control (hereinafter referred to as "EBD control") for controlling distribution between braking force on wheel brakes RR, RL on the rear wheel R side and braking force on wheel brakes FR, FL of the front wheel F side. The braking force control system for a vehicle U1 includes a hydraulic pressure unit 10 provided with various components such as electric magnetic valves, pumps and brake fluid passages, and a controller 20 for controlling the various components of the hydraulic pressure unit 10.

Figure 2:
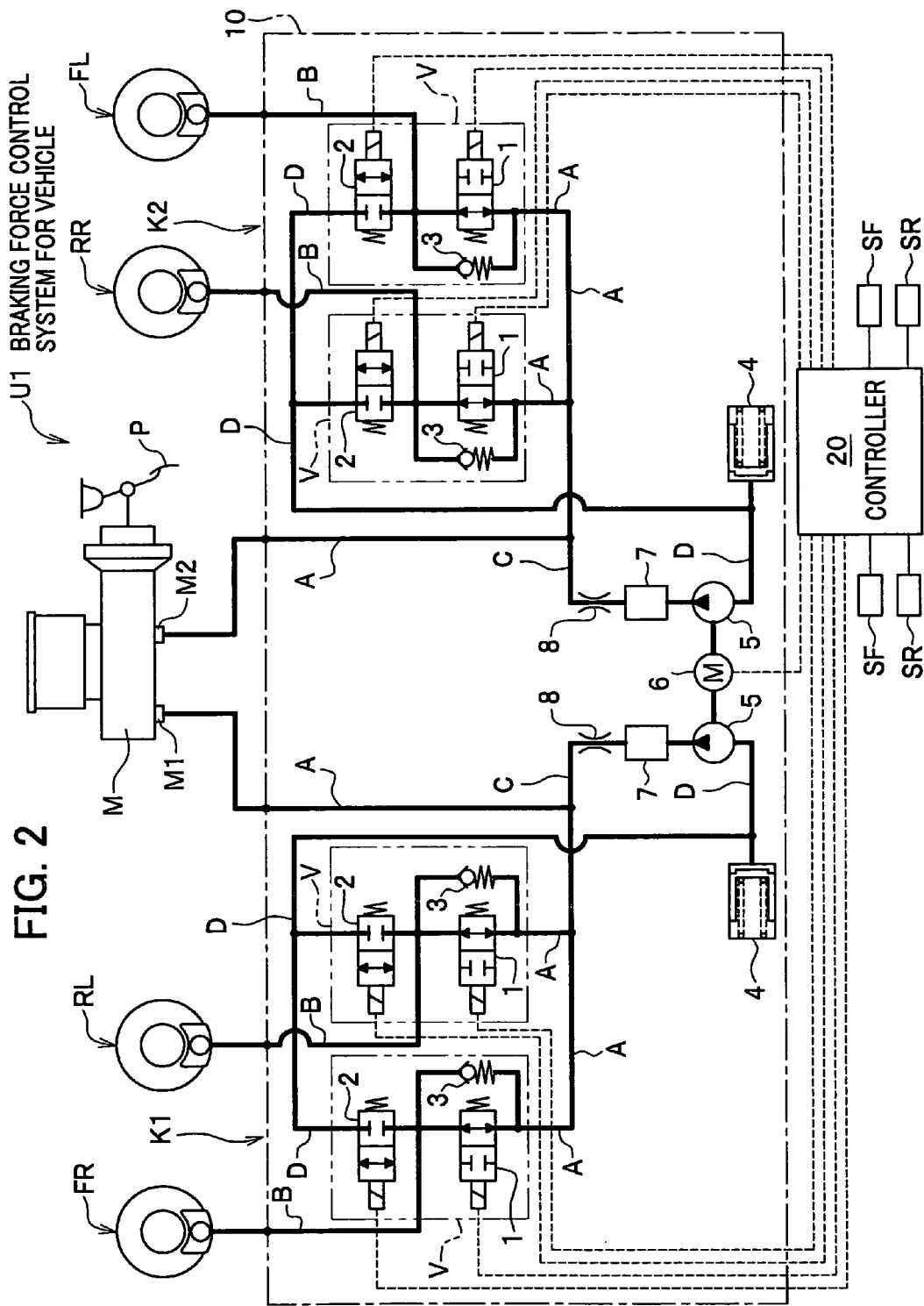
FIG. 2 is a hydraulic pressure circuit diagram of the braking force control system for a vehicle according to the embodiment.

The hydraulic pressure unit 10 is provided between a master cylinder M which is a hydraulic pressure source and the wheel brakes FR, RL, RR, FL. As shown in FIG. 2, the hydraulic pressure unit 10 includes a brake system K1 that applies braking force onto the wheel brakes FR, RL of FR, RL, RR, FL, and a brake system K2 that applies braking force onto the rest wheel brakes RR, FL.

The master cylinder M generates hydraulic pressure according to brake effort applied onto a brake pedal P which is a brake control member, and includes two output ports M1, M2 corresponding to the two brake systems K1, K2.

The brake systems K1 and K2 have the same structure. Therefore, an explanation will be given chiefly on the brake system K1, and on the brake system K2 if necessary.

The brake system K1 includes two control valve units V, V corresponding to the wheel brakes FR, RL, a reservoir 4, a pump 5, a motor 6, a dumper 7 and an orifice 8.

Hereinafter, a flow passage (fluid passage) from the master cylinder M to the control valve units V, V is referred to as an "output hydraulic pressure passage A", and a flow passage from the control valve units V, V to the wheel brakes FR, RL is referred to as a "wheel hydraulic pressure passage B". A flow passage from the pump 5 to the output hydraulic pressure passage A is referred to as an "discharge hydraulic pressure passage C", and a flow passage from the control valve units V, V to the pump 5 is referred to as an "open passage D".

The control valve unit V includes an inlet valve 1, an outlet valve 2 and a check valve 3, and has a function of switching various conditions of the above flow passages, as follows: the control valve unit V switches a pressure boosting condition of allowing a brake fluid flow from the output hydraulic pressure passage A into the wheel hydraulic pressure passage B meanwhile shutting off the brake fluid flow into the open passage D; a pressure reducing condition of shutting off the brake fluid flow from the output hydraulic pressure passage A into the wheel hydraulic pressure passage B meanwhile allowing the brake fluid flow into the open passage D; or an maintaining condition of shutting off the brake fluid flow from the output hydraulic pressure passage A into the wheel hydraulic pressure passage B, shutting off the brake fluid flow into the open passage D as well.

The inlet valve 1 may be an electric magnetic valve (normally open type) provided on the flow passage between the output hydraulic pressure passage A and the wheel hydraulic pressure passage B, and allows a brake fluid flow from the output hydraulic pressure passage A side to the wheel hydraulic pressure passage B side when the inlet valve 1 is in open state, and shuts off this brake flow when in close state. The electric magnetic valve (normally open type) serving as the inlet valve 1 includes electromagnetic coils driving the valve 1, which is electrically connected to the controller 20. According to an instruction from the controller 20, the valve 1 closes when the electromagnetic coils are magnetized and opens when the coils are demagnetized.

The outlet valve 2 may be an electromagnetic valve (normally closed type) provided on the flow passage between the wheel hydraulic pressure passage B and the open passage D, and shuts off the brake fluid flow from the wheel hydraulic pressure passage B side to the open passage D side when the inlet valve 2 is in close state, and allows this brake flow when in open state. The electric magnetic valve (normally closed type) serving as the outlet valve 2 includes electromagnetic coils driving the valve 2, which is electrically connected to the controller 20. According to an instruction from the controller 20, the valve 2 opens when the electromagnetic coils are magnetized and closes when the coils are demagnetized.

The check valve 3 is a one-way valve allowing the brake fluid flow only from the wheel hydraulic pressure passage B side to the output hydraulic pressure passage A side, and is connected in parallel to each input valve 1.

The reservoir 4 is provided on the open passage D, and temporarily reserves the brake fluid to be released from the corresponding outlet valve 2 every time the valve 2 is opened.

The pump 5 is provided between the discharge hydraulic pressure passage C communicating with the output hydraulic pressure passage A and the open passage D. The pump 5 is driven by torque of the motor 6 so as to absorb the brake fluid that is temporarily reserved in the reservoir 4 and discharge the brake fluid to the discharge hydraulic pressure passage C, whereby the brake fluid stored in the reservoir 4 flows back to the output hydraulic pressure passage 4 and others.

The motor 6 serves as a common power source for the pumps 5, 5 on the brake system K1 and the brake system K2, and operates according to an instruction from the controller 20.

The dumper 7 and the orifice 8 cooperatively attenuate pulses of the brake fluid discharged from the pump 5.

Figure 1:
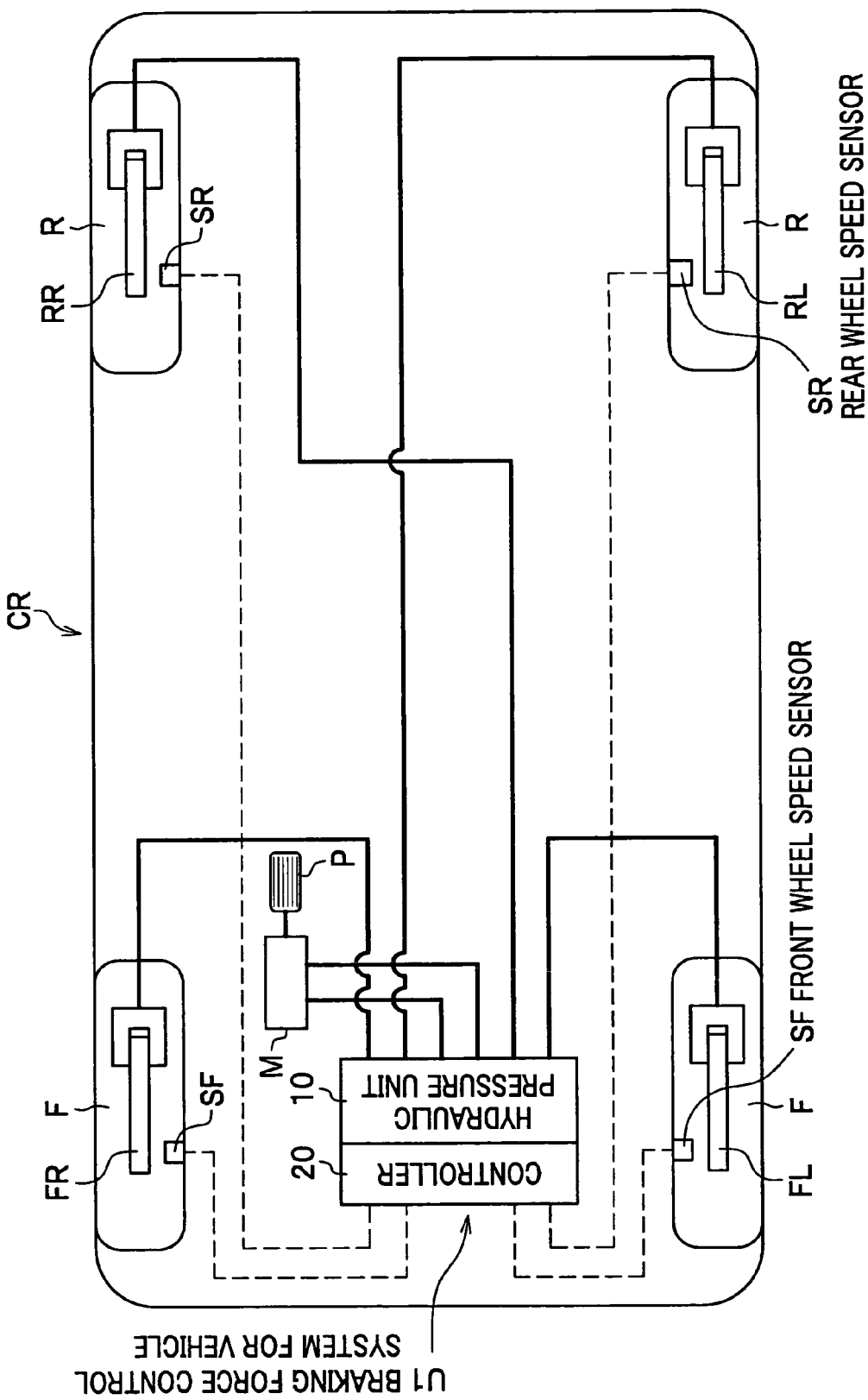
FIG. 1 is a block diagram showing a vehicle provided with a braking force control system for a vehicle according to an embodiment of this invention.
Figure 3:
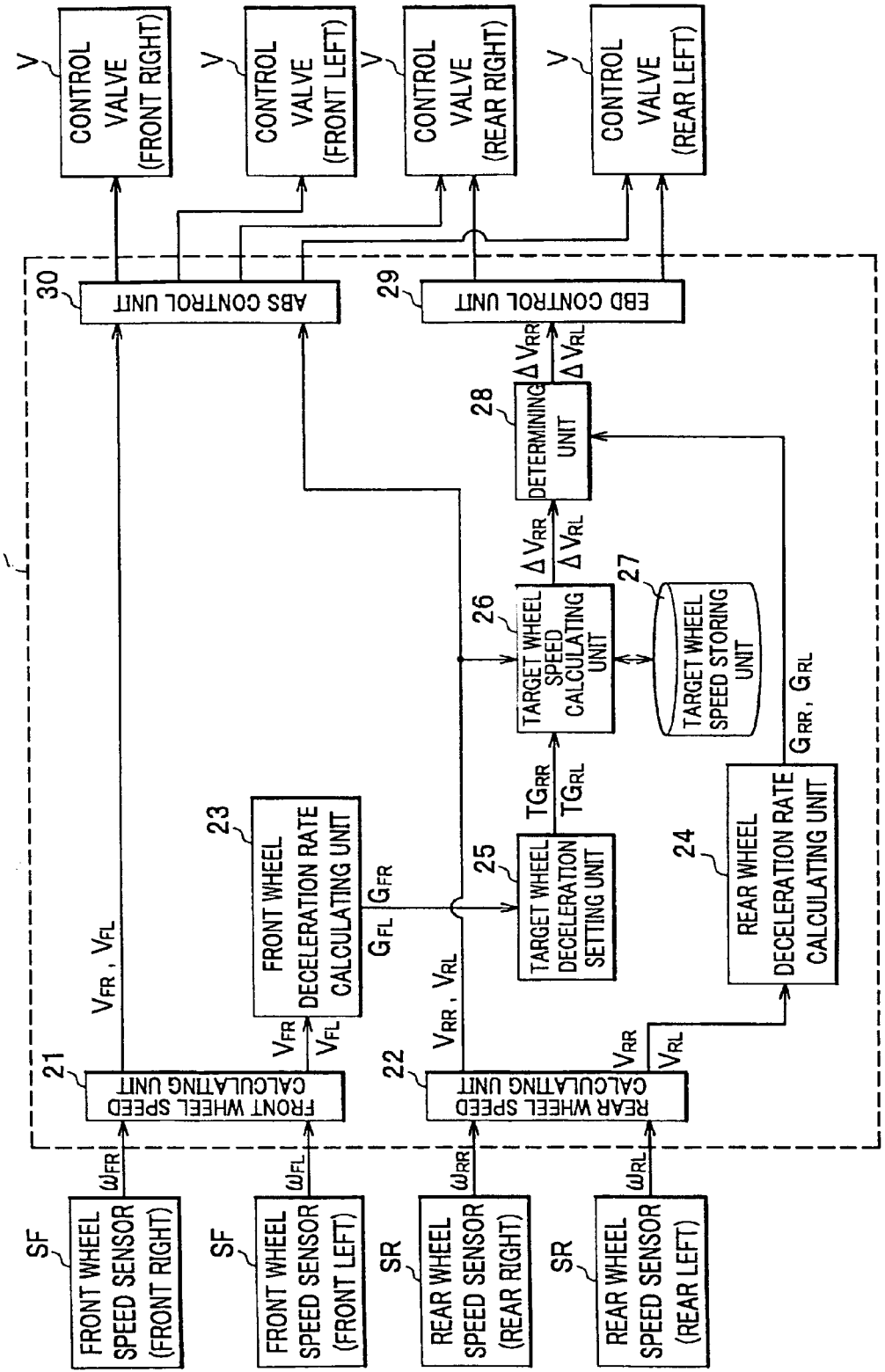
FIG. 3 is a block diagram of a controller of the braking force control system for a vehicle according to the embodiment.

The controller 20 controls open/close of the inlet valve 1 and the outlet valve 2, and operation of the motor 6 based on outputs from the a front wheel speed sensor SF provided on each front wheel F (see FIG. 1) and a rear wheel speed sensor SR provided on each rear wheel R (see FIG. 1). The controller 20 includes CPU (Central Processor Unit), RAM, RON and I/O circuits, which are not shown in the drawing, to control various calculating processes based on inputs from the front wheel speed sensor SF and the rear wheel speed sensor SR, control programs and various threshold values stored on the ROM, etc., whereby functioning as a front wheel speed calculating unit 21, a rear wheel speed calculating unit 22, a front wheel deceleration calculating unit 23, a rear wheel deceleration calculating unit 24, a target wheel deceleration setting unit 25, a target wheel speed calculating unit 26, a target wheel speed storing unit 27, a determining unit 28, a braking force distribution control unit 29 (referred to as a "EBD control unit 29" in FIG. 3) and an anti-lock control unit 30 (referred to as a "ABS control unit 30" in FIG. 3), as shown in FIG. 3. The front wheel speed sensors SF, SF output electric signals corresponding to respective rotation speeds $\omega_{FR}$, $\omega_{FL}$ to the front wheel speed calculating unit 21. Similarly, the rear wheel speed sensors SR, SR output electric signals corresponding to respective rotation speeds $\omega_{RR}$, $\omega_{RL}$ to the rear wheel speed calculating unit 22.

The front wheel speed calculating unit 21 calculates wheel speed $V_{FR}$ or the front wheel F on the right side based on the electric signals outputted from the front wheel speed sensor SF of the front wheel F on the right side, and at the same time, calculates wheel speed $V_{FL}$ of the front wheel F on the left side based on the electric signals outputted from the front wheel speed sensor SF of the front wheel F on the left side, every calculating period $\Delta t$ (time period between a previous calculation and a current calculation). The front wheel speed calculating unit 21 also outputs the thus calculated wheel speeds $V_{FR}$, $V_{FL}$ to the front wheel deceleration calculating unit 23, the determining unit 28 and the anti-lock control unit 30. That the wheel speed $V_{FR}$ of the front wheel F on the right side is calculated by multiplying the electric signals outputted from the front wheel speed sensor SF on the right side by a predetermined calibration factor, yielding a rotation speed $\omega_{FR}$ of the front wheel F on the right side, which is further multiplied by a tire radius r that is previously stored on ROM (not shown). The wheel speed $V_{FL}$ of the front wheel on the left side is calculated by the same manner as is described above.

The rear wheel speed calculating unit 22 calculates wheel speed $V_{RR}$ of the rear wheel F on the right side based on the electric signals outputted from the rear wheel speed sensor SR of the rear wheel F on the right side, and at the same time, calculates wheel speed $V_{RL}$ of the rear wheel F on the left side based on the electric signals outputted from the rear wheel speed sensor SR of the rear wheel F on the left side, every calculating period $\Delta t$ (time period between a previous calculation and a current calculation). The rear wheel speed calculating unit 22 also outputs the thus calculated wheel speeds $V_{RR}$, $V_{RL}$ to the rear wheel deceleration calculating unit 24, the target wheel speed calculating unit 26, the determining unit 28 and the anti-lock control unit 30. That the wheel speed $V_{RR}$ of the rear wheel R on the right side is calculated by multiplying the electric signals outputted from the rear wheel speed sensor SR on the right side by a predetermined calibration factor, yielding a rotation speed $\omega_{RR}$ of the rear wheel F on the right side, which is further multiplied by a tire radius r that is previously stored on ROM (not shown). The wheel speed $V_{RL}$ of the rear wheel R on the left side is calculated by the same manner as is described above.

The front wheel deceleration calculating unit 23 calculates actual deceleration speeds $G_{FR}$, $G_{FL}$ of the right and left front wheels, F, F every calculating period $\Delta t$, and the thus obtained deceleration speeds $G_{FR}$, $G_{FL}$ are outputted to the target wheel deceleration setting unit 25. Assumed that wheel speed of the front wheel F on the right side at time t(n−1) (i.e. previous wheel speed) is $V_{FR}(n-1)$, and wheel speed of the front wheel F on the right side at time t(n) (i.e. current wheel speed) after the calculating period $\Delta t$ is $V_{FR}(n)$, deceleration speed of the front wheel F on the right side $G_{FR}(n)$ may be calculated by the following formula (see FIG. 4).

$$G_{FR}(n)=V_{FR}(n)-V_{FR}(n-1)$$

Similarly, deceleration speed $G_{FL}(n)$ of the front wheel F on the left side may be calculated by the following formula.

$$G_{FL}(n)=V_{FL}(n)-V_{FL}(n-1)$$

Hereinafter, "n−1" denotes "previous" and "n" denotes "current" in the explanations.

The rear wheel deceleration calculating unit 24 calculates actual deceleration speeds $G_{RR}$, $G_{RL}$ of the rear wheels R, R on the right and left sides every calculating period $\Delta t$, and the thus obtained deceleration speeds $G_{RR}$, $G_{RL}$ are outputted to the determining unit 28. Assumed that wheel speed of the rear wheel R on the right side at time t(n−1) (i.e. previous wheel speed) is $V_{RR}(n-1)$, and wheel speed of the rear wheel R on the right side at time t(n) (i.e. current wheel speed) after the calculating period $\Delta t$ is $V_{RR}(n)$, deceleration speed of the rear wheel R on the right side $G_{RR}(n)$ may be calculated by the following formula (see FIG. 4).

$$G_{RR}(n)=V_{RR}(n)-V_{RR}(n-1)$$

Similarly, deceleration speed $G_{RL}(n)$ of the rear wheel R on the left side may be calculated by the following formula.

$$G_{RL}(n)=V_{RL}(n)-V_{RL}(n-1)$$

The target wheel deceleration setting unit 25 sets current target deceleration speeds $TG_{RR}$, $TG_{RL}$ of the rear wheels R, R on the right and left sides, based on the actual deceleration speeds $G_{FR}$, $G_{FL}$ of the front wheels F, F outputted from the front wheel deceleration calculating unit 23, and then outputs the thus obtained target deceleration speeds $TG_{RR}$, $TG_{RL}$ to the target wheel speed calculating unit 26. The target deceleration speed $TG_{RR}(n)$ of the rear wheel R on the right side in a time period between t(n−1) and the time t(n) may be calculated, for example, based on the actual deceleration speed $G_{FR}(n)$ of the front wheel F on the same side (i.e. right side in this case) at the same time, by using the following formula.

$$TG_{RR}(n)=k_1 \times G_{FR}(n)$$

Where, $k_1$ is a fixed number, and if $k_1=1$, then the target deceleration speed $TG_{RR}(n)$ of the rear wheel R on the right side is equal to the actual deceleration speed $G_{FR}(n)$ of the front wheel F on the right side.

Similarly, the target deceleration speed $TG_{RL}(n)$ of the rear wheel R on the left side may be calculated by the following formula.

$$TG_{RL}(n)=k_2 \times G_{FL}(n)$$

Where, $k_2$ is a fixed number, and if $k_2=1$, then the target deceleration speed $TG_{RL}(n)$ of the rear wheel R on the left side is equal to the actual deceleration speed $G_{FL}(n)$ of the front wheel F on the left side.

The target deceleration speeds $TG_{RR}(n)$, $TG_{RL}(n)$ of the rear wheels R, R may be calculated based on an average value of the actual deceleration speeds $G_{FR}(n)$, $G_{FL}(n)$ of the front wheel F, F on the right and left sides by using the following formula.

$$TG_{RR}(n)=TG_{RL}(n)=k_3 \times \{G_{FR}(n)+G_{FL}(n)\}/2$$

Where, $k_3$ is a fixed number, and if $k_3=1$, then the target deceleration speed $TG_{RR}(n)$, $TG_{RL}(n)$ of the right and left rear wheels R, R are equal to an average value of the actual deceleration speeds $G_{FR}(n)$, $G_{FL}(n)$ of right and left front wheels F, F.

The target deceleration speeds $TG_{RR}(n)$, $TG_{RL}(n)$ of the rear wheels R, R on the right and left sides may also be calculated based on either of the actual deceleration speeds $G_{FR}(n)$, $G_{FL}(n)$ of the front wheels F, F on the right and left sides, which has a smaller value, by using the following formula.

$$TG_{RR}(n)=TG_{RL}(n)=k_4 \times \min\{G_{FR}(n), G_{FL}(n)\}$$

Where, $k_4$ is a fixed number, and if $k_4=1$, then the target deceleration speeds $TG_{RR}(n)$, $TG_{RL}(n)$ of the rear wheels R, R on the right and left sides are equal to either smaller value of the actual deceleration speeds $G_{FR}(n)$, $G_{FL}(n)$ of the front wheels F, F on the right and left front sides.

If at least one of the actual deceleration speeds $G_{FR}(n)$, $G_{FL}(n)$ of the front wheels F, F of the right and left sides is larger than a predetermined threshold value $\alpha$, the target wheel deceleration setting unit 25 sets a predetermined deceleration speed G' as the target deceleration speeds $TG_{RR}(n)$, $TG_{RL}(n)$ of the rear wheels R, R on the right and left sides.

The target wheel speed calculating unit 26 calculates a current target wheel speeds $TV_{RR}(n)$, $TV_{RL}(n)$ based on the target deceleration speeds $TG_{RR}(n)$, $TG_{RL}(n)$ of the rear wheels R, R on the right and left sides that have been set by the target wheel deceleration setting unit 25 and the previous target wheel speeds $TV_{RR}(n-1)$, $TV_{RL}(n-1)$ of the rear wheels R, R on the right and left sides, and the obtained target wheel speeds $TV_{RR}(n)$, $TV_{RL}(n)$ are outputted to the target wheel speed storing unit 27. According to the embodiment, the target wheel speed calculating unit 26 subtracts the target deceleration speeds $TG_{RR}(n)$, $TG_{RL}(n)$ from the previous target wheel speed rates $TV_{RR}(n-1)$, $TV_{RL}(n-1)$ so as to obtain the current target wheel speeds $TV_{RR}(n)$, $TV_{RL}(n)$. Specifically, the target wheel speed calculating unit 26 reads out the previous target wheel speeds $TV_{RR}(n-1)$, $TV_{RL}(n-1)$ that are stored on the target wheel speed storing unit 27 (described later). Based on the previous target wheel speeds $TV_{RR}(n-1)$, $TV_{RL}(n-1)$ that have been read out, the target wheel speed calculating unit 26 calculates the current target wheel speeds $TV_{RR}(n)$, $TV_{RL}(n)$ to be used, by using the following formula.

$$TV_{RR}(n)=TV_{RR}(n-1)-TG_{RR}(n)$$

$$TV_{RL}(n)=TV_{RL}(n-1)-TG_{RL}(n)$$

Figure 4:
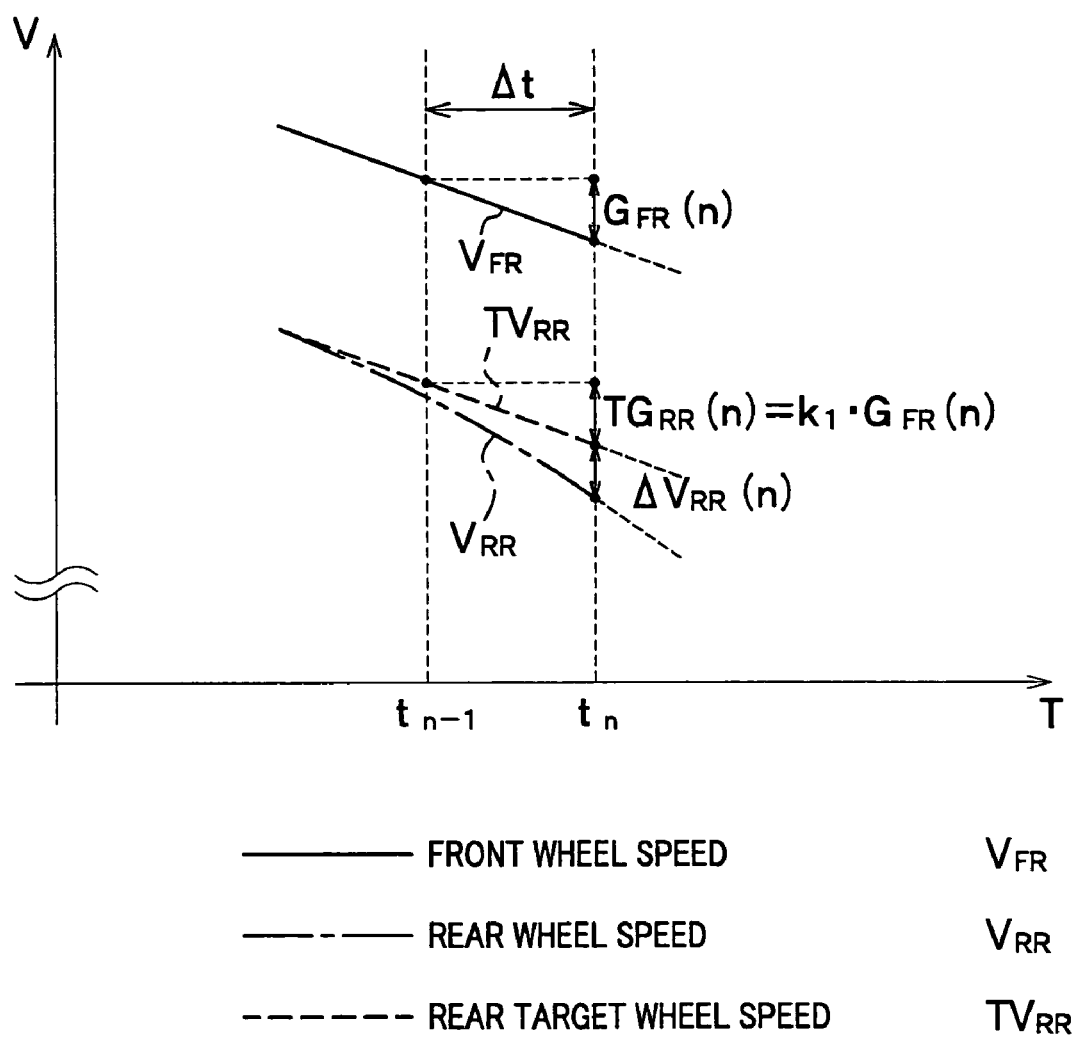
FIG. 4 is a graph for explaining how to calculate a target wheel speed.

The target wheel speed calculating unit 26, as shown in FIG. 4, calculates a speed difference $\Delta V_{RR}(n)$ by subtracting the current target wheel speed $TV_{RR}(n)$ of the rear wheel R from the actual wheel speed $V_{RR}(n)$ of the rear wheel R on the right side that has been currently detected (at time t(n)), and outputs the thus obtained result to the determining unit 28. Similarly, the target wheel speed calculating unit 26 calculates a speed difference $\Delta V_{RL}(n)$ of the rear wheel R on the left side, and outputs the result to the determining unit 28.

The target wheel speed storing unit 27 stores the target wheel speeds $TV_{RR}(n)$, $TV_{RL}(n)$ outputted from the target wheel speed calculating unit 26 as a next target wheel speed to be used next.

Before the determining unit 28 determines that the EBD control is executed, the target wheel speed storing unit 27 stores the actual wheel speeds $V_{RR}$, $V_{RL}$ of the rear wheels R, R that have been calculated by the rear wheel speed calculating unit 22 as initial values for the rear wheels R, R. Specifically, the initial values are corresponding to the previous target wheel speeds $TV_{RR}(0)$, $TV_{RL}(0)$ used when calculating the first target wheel speeds $TV_{RR}(1)$, $TV_{RL}(1)$. It is noted that the target wheel speeds $TV_{RR}(0)$, $TV_{RL}(0)$ are updated every calculating time period $\Delta t$ until the EBD control is started.

The determining unit 28 determines whether or not to execute the EBD control on the braking force of the rear and front wheel brakes. According to the embodiment, the determining unit 28 determines that conditions required to start the EBD control are met if a speed difference between the target wheel speed $TV_{RR}(TV_{RL})$ calculated by the target wheel speed calculating unit 26 and the actual wheel speed $V_{RR}$ ($V_{RL}$) of the rear wheel R calculated by the rear wheel speed calculating unit 22 is a predetermined value or more, and also if the actual deceleration speed $G_{RR}(G_{RL})$ of the rear wheel R calculated by the rear wheel deceleration calculating unit 24 is a predetermined value or more. Therefore, the determining unit 28 outputs the speed differences $\Delta V_{RR}(n)$, $\Delta V_{RL}(n)$ calculated by the target wheel speed calculating unit 26 to the braking force distribution control unit 29.

The braking force distribution control unit 29 controls the braking force on each rear wheel R, so that the actual wheel speeds $V_{RR}$, $V_{RL}$ of the rear wheels R, R on the right and left sides follow the respective target wheel speeds $TV_{RR}(n)$, $TV_{RL}(n)$.

Explaining on the rear wheel R on the right side as an example, the braking force distribution control unit 29 controls the control valve unit V (see FIG. 2) corresponding to the rear wheel R on the right side (wheel brake RR) according to the scale of the speed difference $\Delta V_{RR}(n)$. Specifically, the control valve unit V is controlled in such a manner that, if the speed difference $\Delta V_{RR}(n)$ is equal to a predetermined pressure boost threshold value $\beta_1$ or more ($\beta_1 \leq \Delta V_{RR}(n)$), the inlet valve 1 of the control valve unit V is opened and the outlet valve 2 thereof is closed; if the speed difference $\Delta V_{RR}(n)$ is larger than a predetermined pressure reduction threshold value $\beta_2$ and less than the predetermined pressure boost threshold value $\beta_1$ ($\beta_2 < \Delta V_{RR}(n) < \beta_1$), the inlet valve 1 of the control valve unit V is closed and the outlet valve 2 thereof is closed so as to retain the brake hydraulic pressure effecting on the wheel brake RR; and if the speed difference $\Delta V_{RR}(n)$ is equal to the predetermined pressure reduction threshold value $\beta_2$ or less ($\Delta V_{RR}(n) \leq \beta_2$), the inlet valve 1 of the control valve unit V is closed and the outlet valve 2 thereof is opened so as to reduce the brake hydraulic pressure effecting on the wheel brake RR.

If the inlet valve 1 is opened and the outlet valve 2 is closed, a flow passage is allowed through the master cylinder M to the wheel brake RR, so that brake hydraulic pressure caused by the brake effort of the brake pedal P effects directly on the wheel brake RR, resulting in boosting the brake hydraulic pressure effecting on the wheel brake RR. If the inlet valve 1 and the outlet valve 2 are closed, the brake fluid is locked in the passage closed by the inlet valve 1 and the outlet valve 2, so that the brake hydraulic pressure effecting on the wheel brake RR is constantly retained. If the inlet valve 1 is closed and the outlet valve 2 is opened, the brake fluid effecting on the wheel brake RR is allowed through the open passage D into the reservoir 4, so that the brake hydraulic pressure effecting on the wheel brake RR is reduced.

The braking force distribution control unit 29 finishes the EBD control if the ABS control is executed by the anti-lock control unit 30 (described later).

The anti-lock control unit 30 controls the control valve unit V corresponding to the wheel brakes FR, FL of the front wheels F, F which are likely to be locked, or controls the control valve unit V corresponding to the wheel brakes RR, RL of the rear wheels R, R which are likely to be locked. Specifically, the anti-lock control unit 30 determines whether or not any of the wheels is likely to be locked, based on the speeds of the vehicle body and each wheel. The anti-lock control unit 30 controls open/close of the inlet valve 1 and the outlet valve 2 of the control valve unit V corresponding to a wheel brake of a wheel determined to be likely to be locked. By providing such control on the inlet valve 1 and the outlet valve 2 of the control valve unit V, the brake hydraulic pressure effecting on the wheel brake can be reduced, boosted or retained.

It is noted that, if the anti-lock control unit 30 determines that at least one of the front wheels F, F and the rear wheels R, R is likely to be locked, the anti-lock control unit 30 sets a flag as "1" indicating that the ABS control is being executed.

Figure 5:
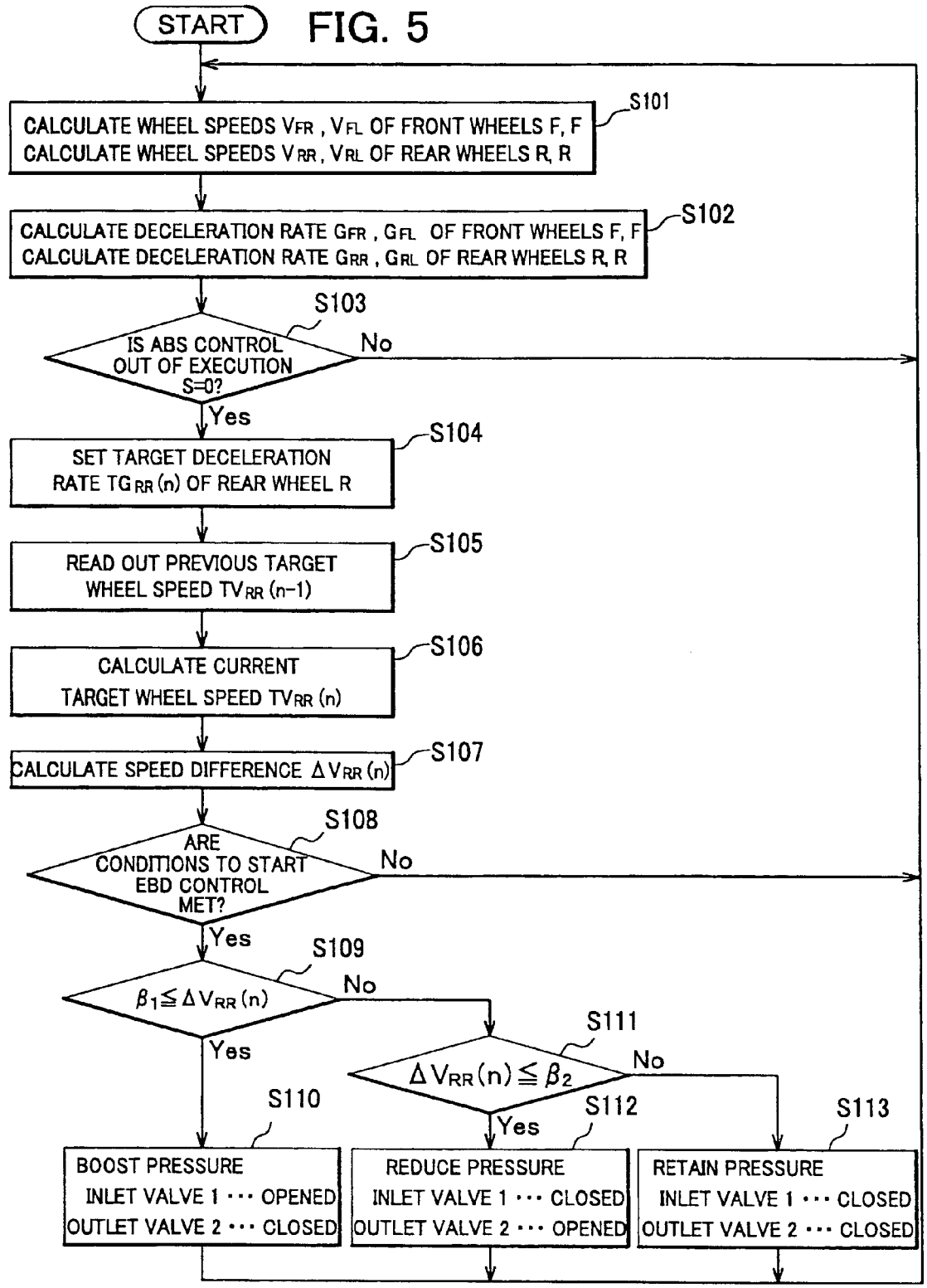
FIG. 5 is a flow chart of explaining how to operate the braking force control system for a vehicle according to the embodiment.

The braking force control system for a vehicle U1, as structured above, is set to execute control programs according to a flow chart of FIG. 5 when an ignition switch (not shown in the drawing) is powered on. If the predetermined conditions are met, the braking force applied on the rear wheels R, R is controlled such that the actual wheel speeds $V_{RR}$, $V_{RL}$ of the rear wheels on the right and left sides follow the target wheel speeds $TV_{RR}$, $TV_{RL}$ respectively, whereby controlling the distribution of the braking force on the rear wheels R, R side and the braking force on the front wheels F, F side.

With reference to the block diagram of FIG. 3 and the flow chart of FIG. 5, a detailed explanation will be given on an operation of the braking force control system for a vehicle U1. When the control program is activated, at first, the front wheel speed calculating unit 21 calculates the actual wheel speeds $V_{FR}$, $V_{FL}$ of the respective front wheels F, F on the right and left sides, as shown at S101, and the rear wheel speed calculating unit 22 calculates the wheel speeds $V_{RR}$, $V_{RL}$ of the respective rear wheels R, R on the right and left sides.

Next, at S102, the front wheel deceleration calculating unit 23 calculates the actual deceleration speeds $G_{FR}$, $G_{FL}$ of the respective front wheels F, F and the rear wheel deceleration calculating unit 24 calculates the actual deceleration speeds $G_{RR}$, $G_{RL}$ of the respective rear wheels R, R.

At S103, it is determined whether or not the ABS control is being executed. If it is determined that the ABS control is out of execution (Yes at S103), the operation is preceded to S104. In other words, if the flag is set as "0" by the anti-lock control unit 30, it is determined that the ABS control is out of execution (Yes at S103); and if the flag is set as "1", it is determined that the ABS control is not out of execution (No at S103) (that is, it is determined that the ABS control is being executed). At S103, if it is determined that the ABS control is not out of execution (No at S103), the ABS control is preferential executed, and the previous target wheel speeds $TV_{RR}(n-1)$, $TV_{RL}(n-1)$ stored on the target wheel speed storing unit 27 are reset, then returning to S101.

After S104, an explanation will be given only on the case of the rear wheel R on the right side as an example, and a duplicated explanation on the case of the rear wheel R on the left side will be omitted.

At S104, the target wheel deceleration setting unit 25 sets the current target deceleration speed $TG_{RR}(n)$ of the rear wheel R on the right side, based on the actual deceleration speed $G_{FR}(n)$ of the front wheel F on the right side outputted from the front wheel deceleration calculating unit 23.

In addition, at S104, although not shown in FIG. 5, the target wheel deceleration setting unit 25 determines whether or not the actual deceleration speed $G_{FR}(n)$ of the front wheel F is larger than the predetermined threshold value α, and if it is determined that the actual deceleration speed $G_{FR}(n)$ is larger than the predetermined threshold value α, the target wheel deceleration setting unit 25 sets a predetermined deceleration speed G' as the target deceleration speed $TG_{RR}(n)$.

Next, proceeding to S105, the target wheel speed calculating unit 26 reads out the previous target wheel speed $TV_{RR}(n-1)$ stored on the target wheel speed storing unit 27.

Then, at S106, the target wheel speed calculating unit 26 calculates the current target wheel speed $TV_{RR}(n)$. The current target wheel speed $TV_{RR}(n)$ may be found, for example, by subtracting the target deceleration speed $TG_{RR}(n)$ that is set by the target wheel deceleration setting unit 25 from the previous target wheel speed $TV_{RR}(n-1)$. The current target wheel speed $TV_{RR}(n)$ is temporarily stored on the target wheel speed storing unit 27.

The target wheel speed $TV_{RR}(1)$ that is used for the initial EBD control (at the time T1 in FIG. 6) is a value obtained by subtracting the target deceleration speed $TG_{RR}(1)$ set by the target wheel deceleration setting unit 25 from the actual wheel speed $V_{RR}(0)$ of the rear wheel R calculated by the rear wheel speed calculating unit 22 at the time T1–Δt. Specifically, at first, the target deceleration speed $TG_{RR}(1)$ is subtracted from the actual wheel speed $V_{RR}(0)$ of the rear wheel R to be a control target, yielding the first target wheel speed $TV_{RR}(1)$, and thereafter, the current target deceleration speed $TG_{RR}(n)$ is subtracted from the previous target wheel speed $T_{RR}(n-1)$, yielding the current target wheel speed $T_{RR}(n)$.

At S107, the target wheel speed calculating unit 26 calculates the speed difference $\Delta V_{RR}(n)$ by subtracting the current target wheel speed $TV_{RR}(n)$ of the rear wheel R from the currently detected actual wheel speed $V_{RR}(n)$ of the rear wheel R on the right side.

At the 108 following S107, the determining unit 28 determines whether or not the conditions required to star the EBS control are met, and if it is determined that the conditions are met (Yes at S108), the operation shifts to S109. At S108, if it is determined that the conditions required to start the EBD control are not met (No at S108), the target wheel speed $TV_{RR}(n-1)$, $TV_{RL}(n-1)$ stored on the target wheel speed storing unit 27 are reset, and then the operation returns to S101.

Then at S109, the braking force distribution control unit 29 determines whether or not the speed difference $\Delta V_{RR}(n)$ is equal to the pressure boost threshold value β1 or more ($\beta 1 \leq \Delta V_{RR}(n)$), and if it is determined that the speed difference $\Delta V_{RR}(n)$ is equal to the pressure boost value β1 or more (Yes at S109), then at S110, the braking force distribution control unit 29 opens the inlet valve 1 and closes the outlet valve 2 of the control valve unit V. Accordingly, by opening the inlet valve 1 and closing the outlet valve 2, the brake hydraulic pressure occurring in the master cylinder M is allowed to effect on the wheel brake RR (see FIG. 2), thereby the brake hydraulic pressure effecting on the rear wheel brake RR is boosted.

At S109, if it is determined that the speed difference $\Delta V_{RR}(n)$ is not equal to the pressure boost threshold value $\beta 1$ or more (No at S109), then, at S111, it is determined whether or not the speed difference $\Delta V_{RR}(n)$ is equal to the pressure reduction threshold value $\beta 2$ or less ($\Delta V_{RR}(n) \leq \beta 2$). If the speed difference $\Delta V_{RR}(n)$ is equal to the pressure reduction threshold value $\beta 2$ or less (Yes at S111), then, at 112, the inlet valve 1 of the control valve unit V is closed and the outlet valve 2 of the control valve unit V is opened. Accordingly, by closing the inlet valve 1 and opening the outlet valve 2, the brake fluid is allowed to flow into the reservoir 4, thereby, the brake hydraulic pressure effecting the rear wheel brake RR is reduced.

At S111, if it is determined that the speed difference $\Delta V_{RR}(n)$ is not equal to the pressure reduction threshold value $\beta 2$ or less (No at S111), that is, the speed difference $\Delta V_{RR}(n)$ is larger than the deceleration threshold value $\beta 2$ and is smaller than the pressure boost threshold value $\beta 1$ ($\beta 2 < \Delta V_{RR}(n) < \beta 1$), then, at S113, the inlet valve 1 and the outlet valve 2 of the control valve unit V are both controlled to be closed. By closing the inlet valve 1 and the outlet valve 2 of the control valve unit V, the brake hydraulic pressure effecting on the wheel brake RR is retained.

Returning to S101 after S110, S112 and S113, the process at each step as described above is repeatedly executed.

With reference to FIG. 6, an explanation will be provided hereinafter on a method of braking force distribution according to the braking force control system for a vehicle U1 of the embodiment. FIG. 6(a) is a graph showing how change the rear and front wheel speeds over time; FIG. 6(b) is a graph showing how changes the speed difference between the actual speed of the rear wheel and the target wheel speed over time; and FIG. 6(c) is a graph showing how changes the brake hydraulic pressure effecting on the wheel brakes of the rear and front wheels over time.

FIG. 6 exemplifies a case of controlling the rear wheel R on the right side based on a deceleration speed of the front wheel F on the right side. FIG. 6 also exemplifies a case in which there exists a difference of tire radius between the front wheel F and the rear wheel R, or there occurs an inevitable difference between the wheel speed $V_{FR}$ (rotation speed) of the front wheel F and the wheel speed $V_{RR}$ (rotation speed) of the rear wheel R due to rotation of the wheels F, R. However, it is not to mention that the braking force control system for a vehicle U1 and the method of braking force distribution according to the embodiment of this invention may also be applicable to a case in which there is no difference between the wheel speed $V_{FR}$ of the front wheel F and the wheel speed $V_{RR}$ of the rear wheel R.

When the braking operation (footing the brake pedal P in FIG. 2) is started at the time T0, the brake hydraulic pressure effecting on the wheel brake RR of the rear wheel R is boosted according to the brake effort of the brake pedal P until the conditions required to start the EBD control are met if a difference between the target wheel speed $TV_{RR}$ and the actual wheel speed $V_{RR}$ of the rear R is equal to a predetermined value or more, and also if the actual deceleration speed $G_{RR}$ of the rear wheel is equal to a predetermined value or more. In a condition in which the EBD control and the ABS control are not executed, the inlet valve 1 of the control valve unit V is opened and the outlet valve 2 of the control valve unit V is closed, so that the brake hydraulic pressure occurring in the master cylinder M directly effects on the wheel brake RR (See FIG. 2).

According to the embodiment, the conditions required to start the EBD control are met at the time T1, and the inlet valve 1 is opened and the outlet valve 2 is closed until the speed difference $\Delta V_{RR}(n)$ between the actual wheel speed $V_{RR}(n)$ and the current target wheel speed $TV_{RR}(n)$ becomes below the pressure boost threshold value $\beta 1$ (see S109 and S110 in FIG. 5). Consequently, the brake hydraulic pressure on the wheel brake RR is continuously boosted according to the brake effort of the brake pedal P.

During the period from the time T2 when the speed difference $\Delta V_{RR}(n)$ becomes below the pressure boost threshold value $\beta 1$ to the time T3 when the speed difference $\Delta V_{RR}(n)$ becomes below the pressure reduction threshold value $\beta 2$, the inlet valve 1 and the outlet valve 2 are closed (see S111, S113 in FIG. 5), whereby the brake hydraulic pressure on the wheel brake RR is retained.

During the period from the time T3 when the speed difference $\Delta V_{RR}(n)$ becomes equal to the pressure reduction threshold value $\beta 2$ or less to the time T4 when the speed difference $\Delta V_{RR}(n)$ exceeds the deceleration threshold value $\beta 2$, the inlet valve 1 is closed and the outlet valve 2 are opened (see S111, S112 in FIG. 5), whereby the brake hydraulic pressure on the wheel brake RR is reduced.

During the period from the time T4 when the speed difference $\Delta V_{RR}(n)$ exceeds the pressure reduction threshold value $\beta 2$ to the time T5 when the speed difference $\Delta V_{RR}(n)$ becomes equal to the pressure boost threshold value $\beta 1$ or more, whereby the inlet valve 1 and the outlet valve 2 are both closed (see S111, S113 in FIG. 5), the brake hydraulic pressure of the wheel brake RR is retained.

After the time T5 when the speed difference $\Delta V_{RR}(n)$ becomes equal to the pressure boost threshold value $\beta 1$ or more, the inlet valve 1 is opened and the outlet valve 2 is closed (S109, S110 in FIG. 5), whereby the brake hydraulic pressure on the wheel brake RR is boosted.

Control on the inlet valve 1 and the outlet valve 2 of the control valve unit V in accordance with the flow as described above brings a proper distribution between the brake hydraulic pressure effecting on the wheel brake FR of the front wheel F and the brake hydraulic pressure effecting on the wheel brake RR of the rear wheel R (see FIG. 6(c)), so that the actual wheel speed $V_{RR}(n)$ of the rear wheel R follows the target wheel speed $TV_{RR}(n)$ (see FIG. 6(a)).

If the actual deceleration speed $G_{RR}(n)$ of the rear wheel R becomes smaller than the predetermined value and the conditions required to start the EBD control are not met any more, the EBD control is temporarily finished (time T6). While the EBD control is not being executed, the inlet valve 1 is opened and the outlet valve 2 is closed, so that the brake hydraulic pressure on the wheel brake RR is boosted according to the brake effort of the brake pedal P.

If the speed difference between the actual wheel speed $V_{FR}$ of the front wheel F and the actual wheel speed $V_{RR}$ of the rear wheel R becomes equal to a predetermined value or more, and also if the actual deceleration speed $G_{RR}$ of the rear wheel R becomes equal to a predetermined value or more, the conditions required to start the EBD control are met (time T7), and the EBD control is resumed (S109 to S113 in FIG. 5).

As explained above, the method for braking force distribution according to the embodiment, the current target wheel speeds $TV_{RR}(n)$, $TV_{RL}(n)$ are calculated based on the actual deceleration speeds $V_{FR}(n)$, $V_{FL}(n)$ of the front wheels F, F and the previous target wheel speeds $TV_{RR}(n-1)$, $TV_{RL}(n-1)$ of the rear wheels. In other words, the method for braking force distribution according to the embodiment, the target wheel speeds $TV_{RR}(n)$, $TV_{RL}(n)$ used for boosting and reducing the braking force on the rear wheel R is set not based on the actual wheel speeds $V_{FR}(n)$, $V_{FL}(n)$ of the front wheels F, F but based on the previous target wheel speeds $TV_{RR}(n-1)$, $TV_{RL}(n-1)$ of the rear wheels R, R. Accordingly, even if there is an inevitable difference between the rotation speeds $\omega_{FR}(n)$, $\omega_{FL}(n)$ of the front wheels F, F, and the rotation speeds $\omega_{RR}(n)$, $\omega_{RL}(n)$ of the rear wheels R, R, it is possible to provide a proper control on distribution between the braking force on the front wheel F, and the braking force on the rear wheel R.

In addition, the target wheel deceleration setting unit 25 sets a predetermined deceleration speed G' as the target deceleration speeds $TG_{RR}(n)$, $TG_{RL}(n)$ if at least one of the actual deceleration speeds $G_{FR}(n)$, $G_{FL}(n)$ of the front wheels F, F is larger than the threshold value $\alpha$. Therefore, even if the actual deceleration speeds $G_{FR}(n)$, $G_{FL}(n)$ of the front wheels F, F become larger than the threshold value $\alpha$ because, for example, the front wheels F, F are likely to be locked, it is possible to prevent such a problem that the deceleration speeds $G_{FR}(n)$, $G_{FL}(n)$ larger than the threshold value $\alpha$ are used for setting the target wheel speeds $TV_{RR}(n)$, $TV_{RL}(n)$ of the rear wheels R, R.

Although the embodiment of this invention exemplifies the braking force control system U1 for such a vehicle that applies braking force onto wheel brakes using brake hydraulic pressure, this invention is not limited thereto, and may be applicable to a braking force control system for such a vehicle that applies braking force onto wheel brakes using electric power.

As explained above, the method of braking force distribution and the braking force control device for a vehicle according to the embodiment of this invention provides a proper control on distribution between braking force on front wheels and braking force on rear wheels even if there exists an inevitable difference between a rotation speed (wheel speed) of a front wheel and a rotation speed (wheel speed) of a rear wheel.

The embodiment according to this invention has been explained as aforementioned. However, the embodiments of this invention are not limited to those explanations, and those skilled in the art ascertain the essential characteristics of this invention and can make the various modifications and variations to this invention to adapt it to various usages and conditions without departing from the spirit and scope of the claims.

What is claimed is:

1. A method of distributing braking force between front wheels and rear wheels by controlling braking force on a rear right wheel and a rear left wheel such that an actual wheel speed of each rear wheel follows a target wheel speed thereof, the method comprising the steps of:
   calculating a current target wheel speed of each rear wheel to be used based on an actual deceleration speed of the right front wheel, the left front wheel or both from wheels and a previous target wheel speed of each rear wheel; and
   controlling braking force on each of the rear wheels based on the thus calculated current target wheel speed, wherein,
   the current target wheel speed of each rear wheel to be used is calculated by:
   setting an actual deceleration speed of the right front wheel, the left front wheel or both front wheels as a target deceleration speed of each rear wheel; and
   calculating a value obtained by subtracting the target deceleration speed of each rear wheel from a corresponding previous target wheel speed of each rear wheel; and wherein,
   if at least one of the actual deceleration speeds of the front wheels is larger than a predetermined threshold value, a predetermined deceleration speed is set as the target deceleration speed of each rear wheel.

2. The method of distributing braking force according to claim 1, wherein the target deceleration speed of each rear wheel is based on an actual deceleration speed of a front wheel on a same side of each rear wheel.

3. The method according to claim 1, wherein
   the current target wheel speed of each rear wheel to be used is subtracted from the actual wheel speed of each rear wheel, and
   based on the thus subtracted value, the braking force on the rear right wheel and the rear left wheel is controlled such that the actual wheel speed of each rear wheel follows the target wheel speed thereof.

4. A method of distributing braking force between front wheels and rear wheels by controlling braking force on a rear right wheel and a rear left wheel such that an actual wheel speed of each rear wheel follows a target wheel speed thereof, the method comprising the steps of:
   calculating a current target wheel speed of each rear wheel to be used based on an actual deceleration speed of the right front wheel, the left front wheel or both front wheels and a previous target wheel speed of each rear wheel; and
   controlling braking force on each of the rear wheels based on the thus calculated current target wheel speed, wherein
   the current target wheel speed of each rear wheel to be used is calculated by:
   setting an actual deceleration speed of the right front wheel, the left front wheel or both front wheels as a target deceleration speed of each rear wheel; and
   calculating a value obtained by subtracting the target deceleration speed of each rear wheel from a corresponding previous target wheel speed of each rear wheel; and, wherein,
   the target deceleration speed of each rear wheel is based on the smaller value of actual deceleration speeds of the front wheels.

5. The method of distributing braking force according to claim 4, wherein the target deceleration speed of each rear wheel is based on an actual deceleration speed of a front wheel on a same side of each rear wheel.

6. The method according to claim 4, wherein
   the current target wheel speed of each rear wheel to be used is subtracted from the actual wheel speed of each rear wheel, and
   based on the thus subtracted value, the braking force on the rear right wheel and the rear left wheel is controlled such that the actual wheel speed of each rear wheel follows the target wheel speed thereof.

7. A braking force control system for a vehicle comprising:
   a braking force distribution control unit for controlling braking force on a rear right wheel and a rear left wheel such that an actual wheel speed of each rear wheel follows a target wheel speed thereof;
   a target wheel deceleration setting unit for setting a target deceleration speed of each rear wheel based on an actual deceleration speed of the right front wheel, the left front wheel or both front wheels; and
   a target wheel speed calculating unit for calculating a current target wheel speed of each rear wheel to be used based on the target deceleration speed of each rear wheel set by the target wheel deceleration setting unit and a previous target wheel speed thereof, wherein, if at least one of the actual deceleration speeds of the front wheels is larger than a predetermined threshold value, a predetermined deceleration speed is set as the target deceleration speed of each rear wheel.

8. The braking force control system for a vehicle according to claim 7, wherein
the target wheel deceleration setting unit sets the actual deceleration speed of the right front wheel, the left front wheel or both front wheels as the target deceleration speed of each rear wheel, and
the target wheel speed calculating unit calculates the current target wheel speed of each rear wheel to be used by subtracting the target deceleration speed of each rear wheel set by the target wheel deceleration setting unit from the previous target wheel speed thereof.

9. The method according to claim 7, wherein
the current target wheel speed of each rear wheel to be used is subtracted from the actual wheel speed of each rear wheel, and
based on the thus subtracted value, the braking force on the rear right wheel and the rear left wheel is controlled such that the actual wheel speed of each rear wheel follows the target wheel speed thereof.

10. A braking force control system for a vehicle comprising:
a braking force distribution control unit for controlling braking force on a rear right wheel and a rear left wheel such that an actual wheel speed of each rear wheel follows a target wheel speed thereof;
a target wheel deceleration setting unit for setting a target deceleration speed of each rear wheel based on an actual deceleration speed of the right front wheel, the left front wheel or both front wheels; and
a target wheel speed calculating unit for calculating a current target wheel speed of each rear wheel to be used based on the target deceleration speed of each rear wheel set by the target wheel deceleration setting unit and a previous target wheel speed thereof, wherein,
the target wheel deceleration setting unit sets the actual deceleration speed of the right front wheel, the left front wheel or both front wheels as the target deceleration speed of each rear wheel,
the target wheel speed calculating unit calculates the current target wheel speed of each rear wheel to be used by subtracting the target deceleration speed of each rear wheel set by the target wheel deceleration setting unit from the previous target wheel speed thereof, and
if at least one of the actual deceleration speeds of the front wheels is larger than a predetermined threshold value, a predetermined deceleration speed is set as the target deceleration speed of each rear wheel.

11. The braking force control system according to claim 10, wherein the target deceleration speed of each rear wheel is based on an actual deceleration speed of a front wheel on a same side of each rear wheel.

12. The method according to claim 10, wherein
the current target wheel speed of each rear wheel to be used is subtracted from the actual wheel speed of each rear wheel, and
based on the thus subtracted value, the braking force on the rear right wheel and the rear left wheel is controlled such that the actual speed of each rear wheel follows the target wheel speed thereof.

13. A braking force control system for a vehicle comprising:
a braking force distribution control unit for controlling braking force on a rear right wheel and a rear left wheel such that an actual wheel speed of each rear wheel follows a target wheel speed thereof;
a target wheel deceleration setting unit for setting a target deceleration speed of each rear wheel based on an actual deceleration speed of the right front wheel, the left front wheel or both front wheels; and
a target wheel speed calculating unit for calculating a current target wheel speed of each rear wheel to be used based on the target deceleration speed of each rear wheel set by the target wheel deceleration setting unit and a previous target wheel speed thereof, wherein
the target wheel deceleration setting unit sets the actual deceleration speed of the right front wheel, the left front wheel or both front wheels as the target deceleration speed of each rear wheel,
the target wheel speed calculating unit calculates the current target wheel speed of each rear wheel to be used by subtracting the target deceleration speed of each rear wheel set by the target wheel deceleration setting unit from the previous target wheel speed thereof, and
the target deceleration speed of each rear wheel is based on the smaller value of actual deceleration speeds of the front wheels.

14. The method according to claim 13, wherein
the current target wheel speed of each rear wheel to be used is subtracted from the actual wheel speed of each rear wheel, and
based on the thus subtracted value, the braking force on the rear right wheel and the rear left wheel is controlled such that the actual wheel speed of each rear wheel follows the target wheel speed thereof.

15. The braking force control system according to claim 13, wherein the target deceleration speed of each rear wheel is based on an actual deceleration speed of a front wheel on a same side of each rear wheel.

* * * * *